JOHN MATTHEWS.
Improvement in Wagons for Fountains Charged with Soda Water.
No. 125,592. Patented April 9, 1872.
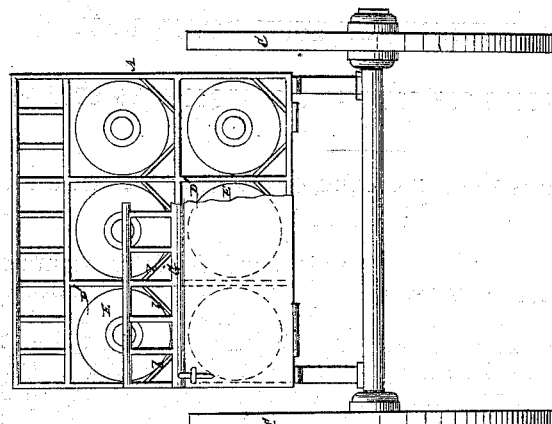
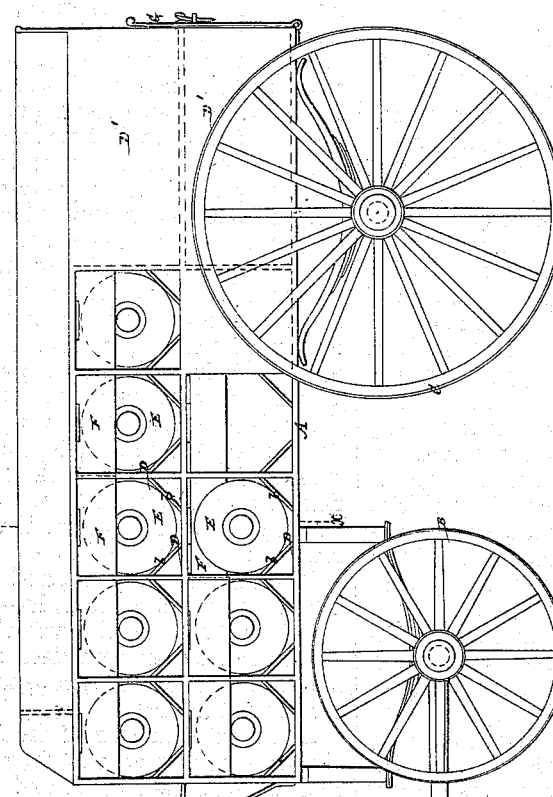
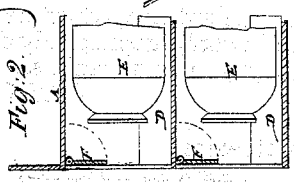
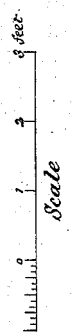

125,592

UNITED STATES PATENT OFFICE.

JOHN MATTHEWS, OF NEW YORK, N. Y.

IMPROVEMENT IN WAGONS FOR FOUNTAINS CHARGED WITH SODA-WATER.

Specification forming part of Letters Patent No. 125,592, dated April 9, 1872; antedated March 30, 1872.

*To all whom it may concern:*

Be it known that I, JOHN MATTHEWS, of the city, county, and State of New York, have invented a new and useful Improvement in Wagons and other Vehicles for Fountains Charged with Soda-Water or other Gaseous Liquids; and I do hereby declare that the following is a full, clear, and exact description of the same, reference being had to the accompanying drawing forming part of this specification, and in which—

Figure 1 represents a side view of a wagon constructed in accordance with my invention; Fig. 2, a transverse section, in part, at the line *x x;* and Fig. 3, a rear elevation.

Similar letters of reference indicate corresponding parts throughout the several figures.

My invention relates to wagons and other vehicles for the transportation of fountains charged with soda-water and other aerated or gaseous liquids under pressure, for supplying venders or dispensers of said liquids. The invention consists in a wagon or vehicle for said purpose, divided into compartments, which are constructed to admit of the fountains, or certain of them, being introduced or withdrawn from either side of the vehicle, and to separately hold the same from rolling about. It likewise consists in a novel arrangement of the compartments in tiers, a portion of which extend across the vehicle, to facilitate the entry and withdrawal of certain of the fountains from either side of the vehicle, and a portion of which compartments are longitudinally disposed in rear of the vehicle, to provide for the introduction and removal of the remaining fountains composing the load through the back of the vehicle, so as to be free from interference by the rear wheels of the vehicle. The invention also consists in a combination, with the compartments or certain of them, of shutters operating to admit of the insertion of the fountains, but preventing their accidental escape or working out, substantially as hereinafter described.

Referring to the accompanying drawing, A represents the body of the wagon; B its front, and C its rear wheels. The body A is made up of horizontal compartments D and D', in tiers, of which there may be any number. These compartments are of a suitable length, width, and depth to separately hold the cylindrical fountains E horizontally within them, and so that said fountains will be held steady therein; for which purpose it is desirable to construct the bottoms of said compartments with concaves, that may be formed by angle pieces *b b*. The one set of compartments D, occupying the forward and main portion of the body, are arranged to extend in a transverse direction from side to side of the wagon, and are open at their ends to admit of the introduction and withdrawal of the fountains through either side of the wagon, according to the side of the street or thoroughfare it is required to take in or deliver the load. Shutters F, hinged at their tops, and opening inward and upward, but restrained from swinging outward, are fitted to the open ends of said compartments to prevent the accidental working out or escape of the fountains through said ends, but, by their freedom to swing inward and upward, offering no obstruction to the introduction of the fountains. The rear compartments D' are arranged to run in direction of the length of the wagon, and are open at their back ends to provide for the introduction and removal of the fountains through the rear of the wagon, by letting down or opening a lid, G, the rear and large wheels C interfering with a side entry and delivery of the fountains. In this way the whole body of the wagon is utilized and the load equally distributed.

What is here claimed, and desired to be secured by Letters Patent, is—

1. The body of the vehicle, composed of compartments constructed substantially as herein described to form separate receptacles for the fountains.

2. The combination of the fountain receptacles or compartments D D', when arranged in relation with each other and the body of the vehicle, substantially as specified.

3. The combination, with the compartments D, of the swinging shutters F, constructed to open inward, substantially as and for the purpose or purposes herein set forth.

JOHN MATTHEWS.

Witnesses:
THEO. M. TUTHILL,
RICHD. W. MOTT.